(12) United States Patent
Gajiwala et al.

(10) Patent No.: US 7,358,314 B2
(45) Date of Patent: Apr. 15, 2008

(54) POLYBENZOXAZOLE-FILLED NITRILE BUTADIENE RUBBER COMPOSITIONS

(75) Inventors: Himansu M. Gajiwala, Layton, UT (US); David G. Guillot, Tremonton, UT (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 11/207,855

(22) Filed: Aug. 18, 2005

(65) Prior Publication Data

US 2007/0254988 A1 Nov. 1, 2007

(51) Int. Cl.
*C08F 36/06* (2006.01)
*C08F 136/04* (2006.01)
*C06D 5/00* (2006.01)

(52) U.S. Cl. .................. 526/335; 526/260; 60/200.1; 60/204; 102/291

(58) Field of Classification Search ............. 526/335, 526/260; 60/200.1, 204; 102/291
See application file for complete search history.

(56) References Cited

U.S. PATENT DOCUMENTS

| | | | |
|---|---|---|---|
| 5,891,561 A * | 4/1999 | Kinoshita et al. | 428/295.1 |
| 6,403,697 B1 | 6/2002 | Mitsunaga et al. | |
| 6,691,505 B2 * | 2/2004 | Harvey et al. | 60/253 |
| 6,812,276 B2 | 11/2004 | Yeager | |
| 6,824,724 B2 | 11/2004 | Mori et al. | |
| 6,824,871 B2 | 11/2004 | Chu | |
| 2002/0018847 A1 | 2/2002 | Guillot | |
| 2002/0142147 A1 | 10/2002 | Sogabe et al. | |
| 2004/0262087 A1 | 12/2004 | Ach | |

FOREIGN PATENT DOCUMENTS

WO    WO 01/68784 A1    9/2001

* cited by examiner

*Primary Examiner*—Ling-Sui Choi
(74) *Attorney, Agent, or Firm*—TraskBritt

(57) ABSTRACT

An insulation composition that comprises at least one nitrile butadiene rubber ("NBR") having an acrylonitrile content that ranges from approximately 26% by weight to approximately 35% by weight and polybenzoxazole ("PBO") fibers. The NBR may be a copolymer of acrylonitrile and butadiene and may be present in the insulation composition in a range of from approximately 45% by weight to approximately 56% by weight of a total weight of the insulation composition. The PBO fibers may be present in a range of from approximately 3% by weight to approximately 10% by weight of a total weight of the insulation composition. A rocket motor including the insulation composition and a method of insulating a rocket motor are also disclosed.

16 Claims, 1 Drawing Sheet

POLYBENZOXAZOLE-FILLED NITRILE BUTADIENE RUBBER COMPOSITIONS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. NAS8-97238 awarded by the National Aeronautics and Space Administration ("NASA").

FIELD OF THE INVENTION

The present invention relates to insulation for use in an article or apparatus, such as a rocket motor. More specifically, the present invention relates to insulation that includes a nitrile butadiene rubber and polybenzoxazole fibers.

BACKGROUND OF THE INVENTION

Combustion of a propellant in a rocket motor creates a hostile environment that is characterized by extremely high temperatures, pressures, and turbulence. Combustion temperatures within the rocket motor typically exceed 5000° F. (2760° C.) and pressures frequently exceed 1500 pounds per square inch ("psi") (10.3 MPascal). In addition, velocities of gases produced during the combustion reach or exceed Mach 0.2 near the throat of the rocket motor. To protect the rocket motor as the propellant is combusted, heat sensitive components of the rocket motor are insulated. Without insulation, the combustion gases would erode and burn through the heat sensitive components, causing the rocket motor to fail.

The rocket motor is typically insulated with a material that provides resistance to high temperatures, pressures, and erosive flow conditions. Various insulative materials have been used, such as phenolic resins, epoxy resins, high temperature melamine-formaldehyde coatings, ceramics, or polyester resins. However, these materials, when cured, become rigid and are essentially unworkable, which makes construction of the rocket motor and processing of these materials difficult. In addition, structures formed from these materials crack or blister when exposed to the rapid temperature and pressure changes that occur as the propellant is burned.

Other insulative materials include an elastomeric polymer that is reinforced with asbestos, polybenzimidazole fibers, or polyaramid fibers. These insulative materials are "ablative" in that they are partially consumed during combustion of the propellant. While the insulative material gradually erodes, the insulative material remains in the rocket motor for a sufficient amount of time to protect the rocket motor while the propellant completely combusts. In other words, the insulative material erodes at a sufficiently slow rate that adequate protection is provided during the operation of the rocket motor.

One insulative material that has been widely used in rocket motors includes asbestos and a nitrile butadiene rubber ("NBR"). For instance, an asbestos-filled nitrile butadiene rubber ("ASNBR") composition has been used in the Reusable Solid Rocket Motor ("RSRM") space shuttle program. When used as an insulative material, the ASNBR composition provides excellent ablative characteristics and good rheological, mechanical, and electrostatic properties. However, due to environmental and health concerns with using asbestos and the closure of asbestos mines in Canada, an asbestos-free replacement for ASNBR is actively being sought. To date, the best replacements for the ASNBR composition include a 7% Kevlar®-filled ethylene propylene diene monomer ("EPDM") material, an 11% Kevlar®-filled EPDM material, and a carbon-filled EPDM material, which are produced by Alliant Techsystems Inc. (Edina, Minn.).

Additional EPDM compositions have been used to insulate rocket motors. United States Patent Application Publication 2002/0018847 to Guillot and U.S. Pat. No. 6,691,505 to Harvey et al. disclose, inter alia, a rocket motor insulation that includes carbon fibers dispersed in an EPDM matrix. The insulation also includes polybenzoxazole fibers ("PBO"), polybenzimidazole fibers, aramid fibers, iron oxide, milled glass, talc, silica, or ceramic clay.

United States Patent Application Publication 2002/0142147 to Sogabe et al. discloses a transmission belt that includes a rubber belt body and a cord, which are integrated by vulcanizing the rubber of the belt body. The belt body is formed from chloroprene rubber or a hydrogenated nitrile rubber and the cord is formed from fibers of poly-p-phenylene-benzobisoxazole. Poly-p-phenylene-benzobisoxazole is also known as poly-p-phenylene-2, 6-benzobisoxazole or polybenzoxazole. Therefore, as used herein "PBO" refers to poly-p-phenylene-benzobisoxazole, poly-p-phenylene-2,6-benzobisoxazole, or polybenzoxazole. U.S. Pat. No. 5,891,561 to Kinoshita et al. also discloses a transmission belt having a fiber cord formed from aramid fibers or PBO fibers. The fiber cord is embedded in rubber, such as a hydrogenated nitrile rubber, a nitrile butadiene rubber, chlorophene rubber, chlorosulfonated polyethylene rubber, or alkylated chlorosulfonated polyethylene rubber.

BRIEF SUMMARY OF THE INVENTION

The present invention relates to an insulation composition that comprises at least one nitrile butadiene rubber ("NBR") having an acrylonitrile content that ranges from approximately 26% by weight ("wt %") to approximately 35 wt % and polybenzoxazole ("PBO") fibers. In one embodiment, the acrylonitrile content of the NBR ranges from approximately 30 wt % to approximately 35 wt %. The NBR may be a copolymer of acrylonitrile and butadiene. The NBR may be present in the insulation composition at a range of from approximately 45 wt % to approximately 56 wt % of a total weight of the insulation composition. The PBO fibers may be present at a range of from approximately 3 wt % to approximately 10 wt % of the total weight of the insulation composition. The insulation composition may further comprise additives, such as at least one reinforcing agent, at least one tackifier, at least one antioxidant, at least one flame retardant, at least one filler, at least one plasticizer, at least one processing aid, carbon black, at least one pigment, at least one bonding agent, at least one cure agent, at least one cure accelerator, at least one cure activator, or mixtures thereof. The insulation composition may also further comprise cellulose fibers, sisal fibers, mineral wool fibers, nylon fibers, polyester fibers, polyimide fibers, polybenzimidazole fibers, polyaramid fibers, or mixtures thereof.

The present invention also relates to a rocket motor that comprises a case, an insulation applied to an inner surface of the case, and a solid propellant disposed in the case. The insulation comprises at least one NBR and PBO fibers. The NBR may be a copolymer of acrylonitrile and butadiene and may have an acrylonitrile content that ranges from approximately 26 wt % to approximately 35 wt %, such as from approximately 30 wt % to approximately 35 wt %. The NBR and PBO fibers may be present in the insulation in the amounts described above. The insulation may further comprise the additives and fibers described above.

The present invention also relates to a method of insulating a rocket motor. The method comprises applying an insulation that comprises at least one NBR and PBO fibers to an inner surface of a rocket motor case and curing the insulation. The NBR may be a copolymer of acrylonitrile and butadiene and may have an acrylonitrile content that ranges from approximately 26 wt % to approximately 35 wt %, such as from approximately 30 wt % to approximately 35 wt %. The NBR and the PBO fibers may be present in the insulation in the amounts described above.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompanying drawing in which:

DETAILED DESCRIPTION OF THE INVENTION

Figure 1B:
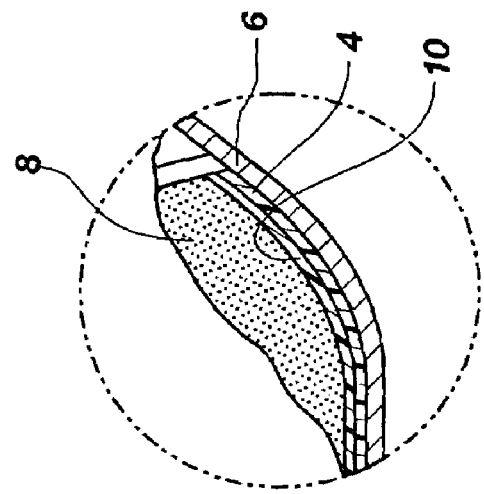
FIG. 1A is a cross-sectional view of a rocket motor that includes the insulation composition of the present invention and FIG. 1B is an enlarged view of a portion of the rocket motor encircled in FIG. 1A.

An insulation composition that includes at least one NBR and PBO fibers is disclosed. The insulation composition may be used as insulation to protect a rocket motor during combustion of a propellant or other article that needs protection from heat and gases. The insulation composition may have rheological, physical, mechanical, electrostatic, and ablative properties that are improved or comparable to the properties of a conventional ASNBR composition. For instance, the insulation composition may have better rheological properties than the ASNBR composition and physical, mechanical, electrostatic, and ablative properties that are similar to those of the ASNBR composition. Since the insulation composition of the present invention is free of asbestos, environmental and health risks associated with the insulation composition may be substantially reduced or eliminated.

The NBR used in the insulation composition may be a nitrile rubber having an acrylonitrile content that ranges from approximately 26 wt % to approximately 35 wt %, such as from approximately 30 wt % to approximately 35 wt %. The acrylonitrile content refers to the percentage of bound acrylonitrile in the NBR. Mixtures of NBRs, each having an acrylonitrile content within the above-mentioned range, may also be used. The NBR may be unhydrogenated or hydrogenated. Examples of NBRs that may be used in the insulation composition include, but are not limited to, those sold under the Nipol® tradename, such as Nipol® 1042, Nipol® 1052, Nipol® 1052-30, Nipol® 1312, or mixtures thereof. The Nipol® products are copolymers of acrylonitrile and butadiene and are commercially available from Zeon Chemicals (Louisville, Ky.). Nipol® 1042 has an acrylonitrile content that ranges from approximately 32 wt % to approximately 34 wt %, a Mooney viscosity at 100° C. that ranges from approximately 75 to approximately 90, and a specific gravity of 0.98. Nipol® 1052 has an acrylonitrile content that ranges from approximately 32 wt % to approximately 34 wt %, a Mooney viscosity at 100° C. that ranges from approximately 45 to approximately 60, and a specific gravity of 0.98. Nipol® 1052-30 is a lower Mooney viscosity version of Nipol® 1052 and has an acrylonitrile content that ranges from approximately 32 wt % to approximately 34 wt %, a Mooney viscosity at 100° C. that ranges from approximately 25 to approximately 40, and a specific gravity of 0.98. Nipol® 1312 is a liquid NBR and has an acrylonitrile content that ranges from approximately 27 wt % to approximately 30 wt %, a Brookfield viscosity at 50° C. that ranges from approximately 20,000 centipoise ("cps") to approximately 30,000 cps, and a specific gravity of 0.96. NBRs that may be used in the insulation composition are available under other tradenames including, but not limited to, the Krynac®, Baymond, Paracil, or Perbunan® tradenames.

The PBO fibers used in the insulation composition may be low modulus (low strength) or high modulus (high strength) fibers. As previously mentioned, PBO is known in the art as poly-p-phenylene-benzobisoxazole, poly-p-phenylene-2,6-benzobisoxazole, or polybenzoxazole. PBO fibers are sold under the Zylon® tradename, which is available from Toyobo Co., Ltd. (Osaka, Japan). The PBO fibers may have a length that ranges from approximately 2 mm to approximately 4 mm, such as approximately 3 mm. In one embodiment, Zylon® AS is used as the PBO fibers. Zylon®AS is "as spun" PBO fibers that have a low modulus and a length of approximately 3 mm. In another embodiment, the PBO fibers are Zylon® HM, which are high modulus fibers having a length of approximately 3 mm. In addition, mixtures of Zylon® AS and Zylon® HM may be used. Alternatively, mixtures of conventional fibers with Zylon® AS, Zylon® HM, or mixtures of Zylon® AS and Zylon® HM may be used.

The amount of the NBR, the PBO fibers, and optional ingredients in the insulation composition may be adjusted to achieve desired rheological, physical, mechanical, electrostatic, and ablative properties, such as a desired viscosity, density, scorch resistance, cure time, Shore A hardness, tensile elongation (parallel to fibers and perpendicular to fibers), tensile strength (parallel to fibers and perpendicular to fibers), surface resistivity, volume resistivity, dielectric constant, or relaxation time. The NBR may be present in the insulation composition in a range of from approximately 45 wt % of a total weight of the insulation composition to approximately 56 wt % of the total weight of the insulation composition. The PBO fibers may be present in the insulation composition in a range of from approximately 3 wt % of the total weight of the insulation composition to approximately 10 wt % of the total weight of the insulation composition.

Small amounts of conventional fibers may optionally be present in the insulation composition. These fibers may include, but are not limited to, cellulose fibers, sisal fibers, mineral wool fibers, nylon fibers, polyester fibers, polyimide fibers, polybenzimidazole fibers, polyaramid fibers, or mixtures thereof.

The insulation composition may optionally include at least one additive from at least one of the following categories: a reinforcing agent, a tackifier, an antioxidant, a flame retardant, a filler, a plasticizer, a processing aid, carbon black, a pigment, or a bonding agent to achieve the desired properties in the insulation composition. A specific ingredient used in the insulation composition may provide one or more functions. One example of a reinforcing agent includes, but is not limited to, Hi-Sil® 233. One example of a tackifying agent includes, but is not limited to, Picco™ 6100, which is an aromatic hydrocarbon resin available from Eastman Chemical Co. (Kingsport, Tenn.). Another example of a tackifying agent includes, but is not limited to, Akrochem® P-87, which is a phenolic resin that is available from Akrochem Chemical Corp. (Akron, Ohio). An antioxidant that may be used in the insulation composition includes, but is not limited to, Agerite® Stalite S, which is available from R.T. Vanderbilt Chemical Company (Norwalk, Conn.). Organic or inorganic flame retardants that may be used include, but are not limited to, Hi-Sil® 233 (amorphous, precipitated silica), Firebrake® ZB (zinc borate), Phos-Chek® P-30 (ammonium polyphosphate), Vertex® 60 (magnesium hydroxide), Melapur® (a melamine derivative), talc, clay, or mixtures thereof. Hi-Sil® 233 is available from PPG Industries, Inc. (Pittsburgh, Pa.), Phos-Chek® P-30 is available from Monsanto (St. Louis, Mo.), Firebrake® ZB is available from US Borax Co. (Los Angeles, Calif.), Vertex® 60 is available from J.M. Huber Corp. (Edison, N.J.), and Melapur® is available from Ciba Specialty Chemicals Holding, Inc. (Basel, Switzerland). Mixtures of organic and inorganic flame retardants may also be used in the insulation composition.

Examples of fillers that may be used include, but are not limited to, silica, Vertex® 60, Oxyvinyls® 500F (polyvinyl chloride), which is available from OxyVinyls, LP (Dallas, Tex.), Mistron Vapor® (talc), which is available from Cyprus Mines Corp. (Englewood, Colo.), Polyplate HMT (delaminated kaolin clay), which is available from J.M. Huber Corp. (Edison, N.J.), or carbon black. An example of a plasticizer for NBR includes, but is not limited to, dioctyl phthalate, which may be absorbed on silica. As used herein, the term "DOP-DLC-A" refers to dioctyl phthalate absorbed on silica. One example of a processing aid includes, but is not limited to, stearic acid. In addition to the materials described above, materials that provide similar functions or properties to the insulation composition and that are sold under different tradenames may also be used.

The insulation composition may also include a cure package, which includes a cure agent and, optionally, a cure accelerator, a cure activator, or combinations thereof. The cure agent may be a sulfur cure agent, a peroxide cure agent, or a bromomethyl alkylated phenolic resin. Examples of sulfur cure agents include, but are not limited to, Crystex® OT-20 (an oil-treated polymeric sulfur), which is available from Flexsys America LP (Akron, Ohio), Akrosperse® IS-70 (a 70% sulfur dispersion), which is available from Akrochem Chemical Corp. (Akron, Ohio), or other forms of elemental sulfur. Sulfur may also be dispersed in a rubber at approximately 70% concentration, such as a SCSD-70 polydispersion, which is a dispersion of 70% insoluble or polymeric sulfur (Crystex®) in 30% of a SBR elastomeric binder. Examples of peroxide cure agents include, but are not limited to, dicumyl peroxide, 2,5-dimethyl-2,5-bis-(t-butylperoxy)hexane, 2,5-dimethyl-2,5-bis-(benzoyl-peroxy) hexane, 2,5-dimethyl-2,5-di(t-butylperoxy)-3-hexane, n-butyl-4,4-bis-(t-butylperoxyl)valerate, 4,4'-methyl-bis-(cyclohexyl-amine)carbomate, 1,1-bis-(t-butylperoxy)-3,3, 5-trimethylcyclohexane, α,α'-bis-(t-butylperoxy)-diisopropylbenzene, 2,5-dimethyl-2,5-bis-(t-butylperoxy) hexyne-3, t-butyl perbenzoate, or mixtures thereof. The cure agent may be present in the insulation composition from approximately 0.5 parts per hundred ("phr") to approximately 8 phr, such as from approximately 1.5 phr to approximately 5 phr. As used herein, the term "phr" refers to parts by weight per one hundred parts by weight of the NBR.

The cure accelerator may be a phosphate cure accelerator, a butyl zimate material, a tetramethylthiuram mono sulfide material, or a benzothiazyl disulfide material. Tetramethylthiuram monosulfide is available as Akrochem® TMTM from Akrochem Chemical Corp. (Akron,Ohio). Tetramethylthiuram monosulfide is also available under the Thionex tradename. Benzothiazyl disulfide is sold under the Altax® tradename and is available from R.T. Vanderbilt Co., Inc. (Norwalk, Conn.). The cure activator may be stearic acid or a metal oxide, such as zinc oxide or magnesium oxide. Zinc oxide is available under the Kadox® tradename from Zinc Corp. of America (Monaca, Pa.), such as Kadox® 920C. In one embodiment, the cure accelerator is Altax®, Akrochem® TMTM, or mixtures thereof and the cure activator is stearic acid, zinc oxide, or combinations thereof.

The insulation composition may be prepared by mixing the NBR, the PBO fibers, and any optional ingredients that may be present to form a master batch. During mixing, the master batch may reach a maximum temperature that ranges from approximately 290° F. to approximately 310° F. The master batch may be mixed until the PBO fibers and any optional ingredients are substantially evenly distributed in the NBR. For instance, the master batch may be mixed for an optimum amount of time to prevent damage to the PBO fibers or to the conventional fibers (if present). The temperature of the master batch may be lowered before adding the cure package to prevent premature curing of the insulation composition. For instance, during the curative mixing, the master batch may be exposed to a maximum temperature that ranges from approximately 200° F. to approximately 220° F. before adding the cure package. The master batch and the cure package may be mixed until the insulation composition has a desired, rubber-like consistency. The insulation composition may be prepared in conventional rubber mixing equipment, such as in an internal mixer, a sigma blade mixer, a vertical blade mixer, or a compounding extruder mixer. Rubber mixing equipment is known in the art and, therefore, is not described in detail herein.

Figure 1A:
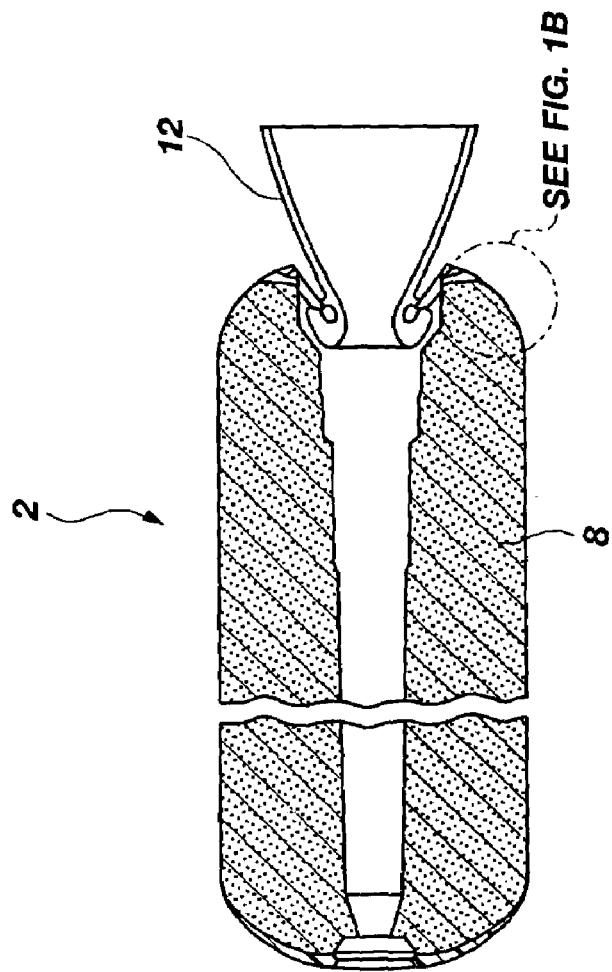

The insulation composition may be calendered or formed into a thin sheet, as known in the art, for use as insulation in a rocket motor. An embodiment of a rocket motor 2 that utilizes the insulation composition of the present invention as insulation 4 is shown in FIGS. 1A and 1B. FIG. 1B is an enlargement of the indicated portion of the rocket motor 2. The insulation 4 may be applied to an interior surface of a case 6 of the rocket motor 2 by conventional techniques, such as by bonding the insulation 4 to the case 6. The case 6 may be formed from a rigid material, such as a metal, a composite material, or a combination of a metal and a composite material. The rocket motor 2 may also include a solid propellant 8, which is illustrated in FIGS. 1A and 1B as a center perforation propellant. However, the invention is not limited to such. The solid propellant 8 may be an end-burning propellant or have any other propellant configuration known in the art. The solid propellant 8 may be disposed in the case 6. The solid propellant 8 may be a conventional propellant that is formulated to combust and produce thrust for attaining rocket motor propulsion. A liner 10 may, optionally, be interposed between the insulation 4 and the solid propellant 8. Compositions for the liner 10 and methods of applying the liner 10 to the rocket motor 2 are known in the art and, therefore, are not discussed in detail herein. The insulation 4 and the liner 10, if present, protect the case 6 of the rocket motor 2 from the extreme temperature and pressure conditions produced when the solid propellant 8 is combusted.

The insulation 4 may be applied to the inner surface of the case 6 of the rocket motor 2 in an uncured form and then cured. For instance, a sheet of the insulation 4 may be laid up or cast into the rocket motor 2 and cured. An adhesive layer (not shown) may, optionally, be used to bond the insulation 4 to the inner surface of the case 6 of the rocket motor 2. Adhesive layers are known in the art and, therefore, compositions of adhesive layers and application of the adhesive layer is not discussed in detail herein. However, for the sake of example only, Chemlok® adhesives may be used to bond the insulation 4 to the inner surface of the case 6 of the rocket motor 2. The insulation 4 may also be applied in an uncured form to a mandrel, cured, and subsequent layers of the rocket motor 2 formed over the insulation 4. Alternatively, the insulation 4 may be cured, cut into appropriate sizes or geometries, and applied to the inner surface of the rocket motor 2 using an adhesive layer. For the sake of example only, the insulation 4 may be cured for from approximately 60 minutes to approximately 120 minutes at a temperature that ranges from approximately 290° F. to approximately 300° F. and at a pressure of between approximately 50 psi and approximately 200 psi. However, additional temperatures, pressures, or amounts of time may be used to cure the insulation 4. For instance, lower or higher temperatures may be used if the cure time is adjusted accordingly. The cured insulation 4 may form a reduced bond line with the surface of the rocket motor 2.

Upon combustion of the solid propellant 8, combustion products of the solid propellant 8 may be directed into nozzle 12 and expelled, producing thrust to propel the rocket motor 2. A char may form on the insulation 4 as flames produced by the combusting solid propellant 8 contact the insulation 4. Without being bound by any theory, it is believed that the PBO fibers in the insulation composition enable the char to remain attached to the insulation 4. While the insulation 4 is ablative and is ultimately consumed during combustion of the solid propellant 8, the char may remain on the insulation 4 for an amount of time sufficient to protect the rocket motor 2. The char is a good insulator and may protect the insulation 4 from ablating at an undesirably fast rate by remaining attached to the insulation 4 for a longer period of time. As such, the rocket motor 2 may be protected from the extreme temperature and pressure conditions produced by combustion of the solid propellant 8.

The insulation composition of the present invention may be formulated as a drop-in replacement for a conventional ASNBR composition. Therefore, the insulation composition may be used in existing rocket motors without needing to significantly adjust the processing and loading techniques currently used to prepare and load the ASNBR composition.

In addition to being used as insulation in a rocket motor, the insulation composition of the present invention may be used in other articles where protection from heat and gases is desired. For example, the insulation composition may be used for heat and gas protection in under-the-hood applications in automobiles. The insulation composition may also be used in conveyor belts, noise damping applications in automobile and other fields, or in routine rubber applications, such as hoses, gaskets, seals, isolators and mounts, cushions, air emission hoses, or dock fenders.

The following examples serve to explain embodiments of the insulation composition of the present invention in more detail. These examples are not to be construed as being exhaustive or exclusive as to the scope of the invention.

EXAMPLES

Example 1

Formulations of Insulation Compositions

Insulation compositions having the ingredients shown in Table 1 were formulated by mixing all of the ingredients, except for the cure package, to form a master batch. During mixing, the temperature of the master batch was maintained at less than or equal to approximately 310° F. The ingredients of the master batch were mixed for up to approximately 25 minutes. The temperature of the master batch was reduced to less than or equal to approximately 220° F. before adding the ingredients of the cure package, which were mixed in with the master batch for up to approximately 5 minutes. The resulting insulation compositions had a rubber-like consistency.

TABLE 1

Insulation Compositions having an NBR(s) and PBO Fibers.

| Ingredient | RDL 5948 (wt %) | RDL 5990 (wt %) | RDL 6054 (wt %) | RDL 6081 (wt %) | RDL 6071 (wt %) | RDL 5967 (wt %) | RDL 6069 (wt %) | RDL 5972 (wt %) | RDL 6070 (wt %) |
|---|---|---|---|---|---|---|---|---|---|
| Nipol ® 1052 | 26.29 | 53.00 | 26.36 | 22.88 | 21.38 | 51.26 | 43.33 | 51.79 | 43.77 |
| Nipol ® 1052-30 | 26.29 | — | — | — | — | — | — | — | — |
| Nipol ® 1042 | — | — | 26.36 | 22.88 | 21.38 | — | — | — | — |
| Nipol ® 1312 | — | — | — | 6.96 | 9.95 | — | 7.65 | — | 7.72 |
| Stearic acid | 1.05 | 1.01 | 1.00 | 1.00 | 1.00 | 0.77 | 0.76 | 0.78 | 0.77 |
| Picco ® 6100 | 2.10 | 5.89 | 5.86 | 5.86 | 3.87 | 6.41 | 6.37 | 6.47 | 6.44 |
| Agerite ® Stalite S | 1.05 | 1.05 | 1.04 | 1.04 | 1.04 | 1.03 | 1.02 | 1.04 | 1.03 |
| Hi-Sil ® 233 | 10.51 | 8.19 | 8.15 | 8.15 | 11.35 | 7.69 | 7.65 | — | — |
| Talc | — | — | — | — | — | 12.81 | 12.74 | — | — |
| Akrochem ® P-87 | — | — | — | — | — | — | — | 20.71 | 20.60 |
| Vertex ® 60 | 2.63 | — | — | — | — | — | — | — | — |
| Polyplate HMT | — | 8.00 | 7.96 | 7.96 | 4.97 | — | — | — | — |

TABLE 1-continued

Insulation Compositions having an NBR(s) and PBO Fibers.

| Ingredient | RDL 5948 (wt %) | RDL 5990 (wt %) | RDL 6054 (wt %) | RDL 6081 (wt %) | RDL 6071 (wt %) | RDL 5967 (wt %) | RDL 6069 (wt %) | RDL 5972 (wt %) | RDL 6070 (wt %) |
|---|---|---|---|---|---|---|---|---|---|
| Firebrake ® ZB | 2.63 | 2.00 | 1.99 | 1.99 | 2.98 | — | — | — | — |
| Oxyvinyls ® 500F | 5.26 | — | — | — | — | — | — | — | — |
| Zylon ® HM fibers, 3 mm | 4.21 | 5.00 | — | — | — | — | — | — | — |
| Zylon ® AS fibers, 3 mm | — | — | 4.97 | 4.97 | 2.98 | 6.00 | 5.96 | 5.02 | 4.99 |
| Phos-Chek ® P-30 | 7.89 | — | — | — | — | — | — | — | — |
| DOP-DLC-A | 5.26 | 10.00 | 9.95 | 9.95 | 9.95 | 9.15 | 9.10 | 9.24 | 9.19 |
| Melapur ® | — | 1.00 | 0.99 | 0.99 | — | — | — | — | — |
| Carbon black | 0.67 | 0.70 | 0.70 | 0.70 | 0.70 | 0.26 | 0.25 | 0.26 | 0.26 |
| Zinc oxide | 2.12 | 2.12 | 2.11 | 2.11 | 2.11 | 2.56 | 2.55 | 2.59 | 2.57 |
| Altax ® | 0.79 | 0.78 | 0.78 | 0.78 | 0.78 | 0.77 | 0.76 | 0.78 | 0.77 |
| Akrochem ® TMTM | — | — | — | — | — | 0.03 | 0.03 | 0.03 | 0.03 |
| Crystex ® Sulfur | 1.26 | 1.26 | — | — | — | 1.28 | — | 1.29 | — |
| SCSD-70 Polydisersion | — | — | 1.79 | 1.79 | 1.79 | — | 1.82 | — | 1.85 |
| P-84[1] | — | — | — | — | 3.76 | — | — | — | — |

[1]Polyimide fibers available from Lenzing AG (Lenzing, Austria)

Example 2

Rheological Properties of the Insulation Compositions

The rheological properties of the insulation compositions described in Example 1 were determined by conventional techniques. The results of the rheological testing are shown in Table 2. For comparative purposes, the rheological properties of an ASNBR composition are also provided. The ASNBR composition is produced by Esterline-Kirkhill Elastomers.

Example 3

Physical, Mechanical, and Electrostatic Properties of the Insulation Compositions Physical, mechanical, and electrostatic properties of the insulation compositions described in Example 1 are shown in Table 3. These properties were determined by conventional techniques. The values for the mechanical properties of RDL6054, RDL6069, RDL6071, and RDL6072 were measured at 2"/minute, while those for RDL5948, RDL5967, RDL5972, RDL5990, and ASNBR were measured at 20"/minute. For comparative purposes, the physical, mechanical, and electrostatic properties of the ASNBR composition are also shown.

TABLE 2

Rheological Properties of ASNBR, RDL5948, RDL5990, RDL6054, RDL6081, RDL6071, RDL5967, RDL6069, RDL5972, and RDL6070.

| Property | ASNBR | RDL 5948 | RDL 5990 | RDL 6054 | RDL 6081 | RDL 6071 | RDL 5967 | RDL 6069 | RDL 5972 | RDL 6070 |
|---|---|---|---|---|---|---|---|---|---|---|
| Mooney Viscosity (MV) | 44-88 | 67.44 | 44.30 | 42.95 | 25.56 | 31.48 | 45.9 | 22.48 | 27.6 | 18.59 |
| Mooney Scorch[1] (minutes) | 5-30 | 22.23 | 24.90 | 21.63 | 25.52 | 24.92 | 22.7 | 25.88 | 5.3 | 6.22 |
| TS2 (minutes)[2] | 5.34 | 5.21 | 16.67 | 12.63 | 16.51 | 14.02 | 19.7 | 16.32 | 2.4 | 3.09 |
| TC90 (minutes)[3] | 64.73 | 35.33 | 61.19 | 34.06 | 65.68 | 54.49 | 62.0 | 43.84 | 34.7 | 40.24 |

[1]MS + 1 at 290° F. (as determined by ASTM D1646)
[2]TS2 is the time to a 2 point rise above minimum viscosity measured by oscillating disk rheometer ("ODR") at 300° F. (as determined by ASTM D2084)
[3]TC90 is the 90 percent cure time measured by ODR at 300° F. (as determined by ASTM D2084)

As shown in Table 2, the insulation compositions had similar or improved rheological properties compared to the properties of the ASNBR composition.

TABLE 3

Physical, Mechanical, and Electrostatic Properties of ASNBR, RDL5948, RDL5990, RDL6054, RDL6071, RDL5967, RDL6069, RDL5972, and RDL6070.

| Property | ASNBR | RDL 5948 | RDL 5990 | RDL 6054 | RDL 6071 | RDL 5967 | RDL 6069 | RDL 5972 | RDL 6070 |
|---|---|---|---|---|---|---|---|---|---|
| Density (g/cm$^3$)[1] | 1.255-1.305 | 1.216 | 1.190 | 1.189 | 1.184 | 1.219 | 1.2031 | 1.110 | 1.0895 |
| Shore A Hardness[2] | 75-85 | 77.7 | 68.3 | — | — | 73.0 | — | 88.6 | — |
| Tensile Elongation parallel to fibers) (%)[3] | 50+ | 24.1 | 49.5 | 96.4 | 33.2 | 38.1 | 55.2 | 47.1 | 30.3 |
| Tensile Elongation (perpendic. to fibers) (%)[3] | 225+ | 318.0 | 668.0 | 536 | 413 | 545 | 683 | 254 | 265 |
| Tensile Strength (parallel to fibers) (%)[3] | 1000+ | 1770 | 1720 | 1490 | 1250 | 1870 | 1770 | 2110 | 2720 |
| Tensile Strength (perpendic. to fibers) (%)[3] | 700+ | 776 | 909 | 617 | 500 | 826 | 515 | 1690 | 1210 |
| Surface Resistivity (ohms/sq) | 6.1 × 10$^{12}$ | 6.15 × 10$^{12}$ | 6.11 × 10$^{12}$ | 2.49 × 10$^{12}$ | 2.03 × 10$^{12}$ | 7.32 × 10$^{12}$ | 6.08 × 10$^{12}$ | 4.25 × 10$^{12}$ | 3.07 × 10$^{12}$ |
| Volume Resistivity (ohm-cm) | 6.6 × 10$^{12}$ | 1.81 × 10$^{12}$ | 3.01 × 10$^{12}$ | 2.80 × 10$^{11}$ | 1.53 × 10$^{11}$ | 3.12 × 10$^{12}$ | 4.03 × 10$^{11}$ | 2.46 × 10$^{12}$ | 3.01 × 10$^{11}$ |
| Dielectric constant | 8.75 | 9.15 | 7.37 | 7.73 | 7.87 | 6.96 | 7.37 | 5.43 | 5.67 |
| Relaxation time (sec) | 5.10 | 1.44 | 1.95 | 0.19 | 0.11 | 1.92 | 0.26 | 1.17 | 0.15 |

[1] As determined by ASTM D792
[2] As determined by ASTM D2240
[3] As determined by ASTM D412

The insulation compositions had physical, mechanical, and electrostatic properties similar to the desirable properties of the ASNBR composition. One exception, however, is RDL6070, which had undesirable mechanical properties. The insulation compositions had a slightly lower density than that of the ASNBR composition. The other properties of the insulation compositions were similar to those of the ASNBR composition, except for the tensile elongation parallel to the fibers. However, the tensile elongation parallel to the fibers is sufficient for the insulation compositions to be used in most applications.

Example 4

Ablative Performance of the Insulation Compositions

The ablative performance of the insulation compositions described in Example 1 was determined in a high mach seventy pound char motor. Each of the insulation compositions was formed into a thin sheet and tested in the char motor. As known in the art, the char motor simulated typical temperature and pressure conditions in a low velocity, mid velocity, or high velocity section of a conventional rocket motor. The thickness of each of the insulation compositions was measured at selected intervals, nominally one inch apart, before firing the char motor. The weight of each of the insulation compositions was also measured before firing. The insulation compositions were then assembled into the low velocity section, the middle velocity section, and the high velocity section of the char motor. After firing, the char motor was disassembled, and the thickness and weight of each insulation composition was measured again. The rate at which the insulation composition is reduced or erodes is expressed in terms of the reduction of the thickness of the insulation composition per second and is referred to as the material affected rate or material ablation rate ("MAR"). The MAR of the insulation composition was determined by subtracting the post-fired thickness of virgin insulation (i.e., after the char had been removed) at a given point from the pre-fired thickness at the same point and dividing the result by the burn time of the motor. The average weight loss of the insulation composition was determined as a function of the pre-fired weight. The MAR and average weight loss are indicators of damage to the insulation composition (ablation), where lower numbers indicate better insulative and ablative performance. The ablative performance of the insulation compositions is shown in Tables 4 and 5.

TABLE 4

Ablative Performance for ASNBR, RDL5948, RDL5990, RDL5967, and RDL5972.

| Property | ASNBR Motor # 1152 | RDL5948 | ASNBR Motor # 1188 | RDL5990 | RDL5967 | ASNBR CFII-03 | RDL5972 |
|---|---|---|---|---|---|---|---|
| Low velocity region: Average MAR (mils/sec) | 3.28 | 3.06 | 3.00 | 3.02 | 2.7 | 3.3 | 2.6 |
| Low velocity region: Average Weight Loss (%) | 8.85 | 8.76 | 9.00 | 9.00 | 8.5 | 10.1 | 7.7 |
| Mid velocity region: Average MAR (mils/sec) | 9.90 | 8.59 | 9.20 | 10.00 | 10.1 | 9.3 | 10.9 |
| Mid velocity region: Average Weight Loss (%) | 10.32 | 9.47 | 10.40 | 10.80 | 11.3 | 10.7 | 12.5 |
| High velocity region: Average MAR (mils/sec) | 12.89 | 14.32 | 13.2 | 15.50 | 14.3 | 14.2 | 13.7 |
| High velocity region: Average Weight Loss (%) | 13.84 | 14.33 | 14.0 | 15.20 | 15.6 | 14.5 | 15.2 |

TABLE 5

Ablative Performance for RDL6069, RDL6071, and RDL6054.

| Property | ASNBR Char Motor # 1217 | RDL6069 | ASNBR Char Motor # 1218 | RDL6071 | ASNBR Char Motor # 1215 | RDL6054 |
|---|---|---|---|---|---|---|
| Low velocity region: Average MAR (mils/sec) | 3.28 | 3.46 | 2.98 | 3.53 | 3.21 | 3.20 |
| Low velocity region: Average Weight Loss (%) | 9.21 | 8.72 | 9.03 | 10.09 | 8.93 | 9.38 |
| Mid velocity region: Average MAR (mils/sec) | 9.62 | 9.37 | 9.26 | 9.77 | 9.33 | 10.53 |
| Mid velocity region: Average Weight Loss (%) | 11.12 | 12.72 | 10.51 | 12.00 | 10.38 | 11.71 |
| High velocity region: Average MAR (mils/sec) | 14.37 | 14.59 | 14.83 | 14.47 | 15.23 | 15.24 |
| High velocity region: Average Weight Loss (%) | 14.62 | 14.85 | 14.81 | 14.97 | 15.19 | 16.38 |

The results in Tables 4 and 5 show that the PBO fiber-filled insulative compositions had ablative properties that are similar to those of the ASNBR composition.

In summary, the insulation compositions of the present invention had similar or better rheological properties and similar physical, mechanical, electrostatic, and ablative properties compared to the ASNBR composition. As such, the insulation compositions are suitable drop-in replacements for the ASNBR composition.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An insulation composition comprising at least one nitrile butadiene rubber with polybenzoxazole fibers distributed therein, wherein the at least one nitrile butadiene rubber has an acrylonitrile content within a range of from approximately 26% by weight to approximately 35% by weight and the polybenzoxazole fibers comprise from approximately 3% by weight to less than 10% by weight of a total weight of the insulation composition.

2. The insulation composition of claim 1, wherein the at least one nitrile butadiene rubber comprises a copolymer of acrylonitrile and butadiene.

3. The insulation composition of claim 1, wherein the at least one nitrile butadiene rubber has an acrylonitrile content ranging from approximately 30% by weight to approximately 35% by weight.

4. The insulation composition of claim 1, wherein the at least one nitrile butadiene rubber comprises from approximately 45% by weight to approximately 56% by weight of a total weight of the insulation composition.

5. The insulation composition of claim 1, wherein the polybenzoxazole fibers have a length within a range of from approximately 2 mm to approximately 4 mm.

6. The insulation composition of claim 1, further comprising at least one reinforcing agent, at least one tackifier, at least one antioxidant, at least one flame retardant, at least one filler, at least one plasticizer, at least one processing aid, carbon black, at least one pigment, at least one bonding agent, at least one cure agent, at least one cure accelerator, at least one cure activator, or mixtures thereof.

7. The insulation composition of claim 1, further comprising cellulose fibers, sisal fibers, mineral wool fibers, nylon fibers, polyester fibers, polyimide fibers, polybenzimidazole fibers, polyaramid fibers, or mixtures thereof.

8. An insulation composition comprising:
at least one nitrile butadiene rubber having an acrylonitrile content within a range of approximately 26% by weight to approximately 35% by weight; polybenzoxazole fibers comprising from approximately 3% by weight to less than 10% by weight of a total weight of the insulation composition; and at least one reinforcing agent, at least one tackifier, at least one antioxidant, at least one flame retardant, at least one filler, at least one plasticizer, at least one processing aid, carbon black, at least one pigment, at least one cure agent, at least one cure accelerator, at least one cure activator, or mixtures thereof.

9. A rocket motor, comprising: a case, an insulation applied to an inner surface of the case, and a solid propellant disposed in the case, wherein the insulation comprises at least one nitrile butadiene rubber with polybenzoxazole fibers distributed therein, the at least one nitrile butadiene rubber comprising an acrylonitrile content within a range of from approximately 26% by weight to approximately 35% by weight and the polybenzoxazole fibers comprising from approximately 3% by weight to less than 10% by weight of a total weight of the insulation.

10. The rocket motor of claim 9, wherein the at least one nitrile butadiene rubber comprises a copolymer of acrylonitrile and butadiene.

11. The rocket motor of claim 9, wherein the at least one nitrile butadiene rubber has an acrylonitrile content within a range of from approximately 26% by weight to approximately 35% by weight.

12. The rocket motor of claim 9, wherein the at least one nitrile butadiene rubber has an acrylonitrile content within a range of from approximately 30% by weight to approximately 35% by weight.

13. The rocket motor of claim 9, wherein the at least one nitrile butadiene rubber comprises from approximately 45% by weight to approximately 56% by weight of a total weight of the insulation.

14. The rocket motor of claim 9, wherein the polybenzoxazole fibers have a length within a range of from approximately 2 mm to approximately 4 mm.

15. The rocket motor of claim 9, wherein the insulation further comprises at least one reinforcing agent, at least one tackifier, at least one antioxidant, at least one flame retardant, at least one filler, at least one plasticizer, at least one processing aid, carbon black, at least one pigment, at least one bonding agent, at least one cure agent, at least one cure accelerator, at least one cure activator, or mixtures thereof.

16. The rocket motor of claim 9, wherein the insulation further comprises cellulose fibers, sisal fibers mineral wool fibers, nylon fibers, polyester fibers, polyimide fibers, polybenzimidazole fibers, polyaramid fibers, or mixtures thereof.

* * * * *